United States Patent [19]

Lindsay et al.

[11] Patent Number: 5,208,713
[45] Date of Patent: May 4, 1993

[54] BISTABLE MAGNETIC/ELECTROMAGNETIC LATCH FOR DISK FILE ACTUATOR

[75] Inventors: Joshua Lindsay, Redwood City; Philip W. Rich, San Jose, both of Calif.

[73] Assignee: Quantum Corporation, Milpitas, Calif.

[21] Appl. No.: 696,629

[22] Filed: May 7, 1991

[51] Int. Cl.$^5$ .................... G11B 5/54; G11B 21/22
[52] U.S. Cl. .................................. 360/105; 360/75
[58] Field of Search .......................... 360/104-106, 360/75

[56] References Cited

U.S. PATENT DOCUMENTS

| | | | |
|---|---|---|---|
| 4,139,874 | 2/1979 | Shiraishi | 360/86 |
| 4,594,627 | 6/1986 | Viskochil et al. | 360/105 |
| 4,654,735 | 3/1987 | Izraelev et al. | 360/104 |
| 4,660,120 | 4/1987 | Manzke et al. | 360/137 |
| 4,686,595 | 8/1987 | Bryer | 360/106 |
| 4,692,829 | 9/1987 | Campbell | 360/105 |
| 4,706,142 | 11/1987 | Hattori et al. | 360/105 |
| 4,716,480 | 12/1987 | Wiens et al. | 360/105 |
| 4,751,595 | 6/1988 | Kishi et al. | 360/105 |
| 4,764,831 | 8/1988 | Patel | 360/105 |
| 4,851,943 | 7/1989 | Perry | 360/105 |
| 4,868,695 | 9/1989 | Quatro et al. | 360/104 |
| 4,881,139 | 11/1989 | Hazebrouck | 360/105 |
| 4,890,176 | 12/1989 | Casey et al. | 360/105 |
| 4,903,157 | 2/1990 | Malek | 360/105 |
| 4,947,274 | 8/1990 | Casey et al. | 360/105 |
| 4,965,684 | 10/1990 | Stefansky | 360/78.12 |
| 5,124,867 | 6/1992 | Kitahori et al. | 360/105 |

FOREIGN PATENT DOCUMENTS

| | | | |
|---|---|---|---|
| 3742736 | 3/1989 | Fed. Rep. of Germany | 360/105 |
| 90/05360 | 5/1990 | PCT Int'l Appl. | 360/105 |

Primary Examiner—A. J. Heinz
Assistant Examiner—Jefferson Evans
Attorney, Agent, or Firm—David B. Harrison

[57] ABSTRACT

A bistable magnetic/electromagnetic latch sub-assembly for releasably latching a disk file actuator in order to park data transducer heads at a predetermined location of a data storage disk rotatably mounted to a base within a fixed disk data storage subsystem, comprises a mounting flange for mounting to the base in operative proximity to the disk file actuator, a latch body rotatably mounted to the mounting flange, the latch body including a permanent magnet and an actuator engagement latch. Plural detent pins extend from the mounting flange and limit rotational displacement of the latch body. The pins coact with the permanent magnet to hold the latch body at a release detent position and also to hold the latch body at an armed detent position wherein the actuator engagement latch is positioned to engage and latch the actuator. An electrical coil is fixed to the mounting flange in operative proximity to the permanent magnet and generates latch position switching fluxes for switching the latch body between the armed detent position and the release detent position in accordance with the direction of an intermittent actuation current flow.

16 Claims, 3 Drawing Sheets

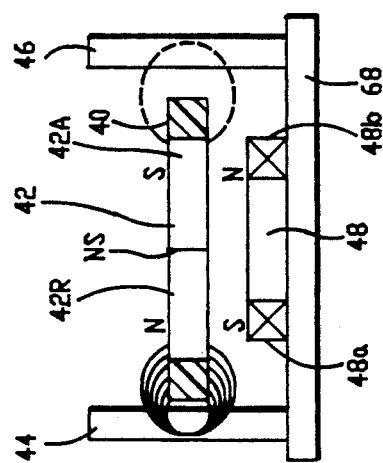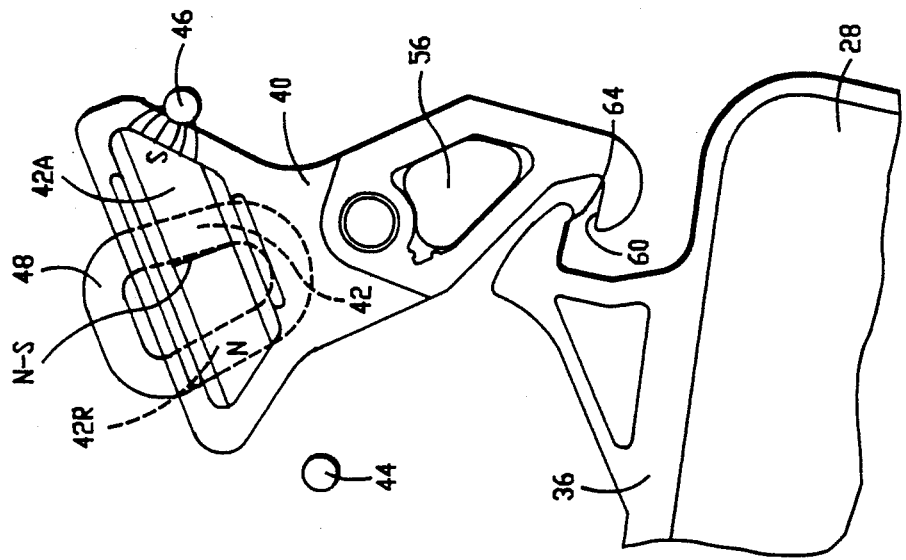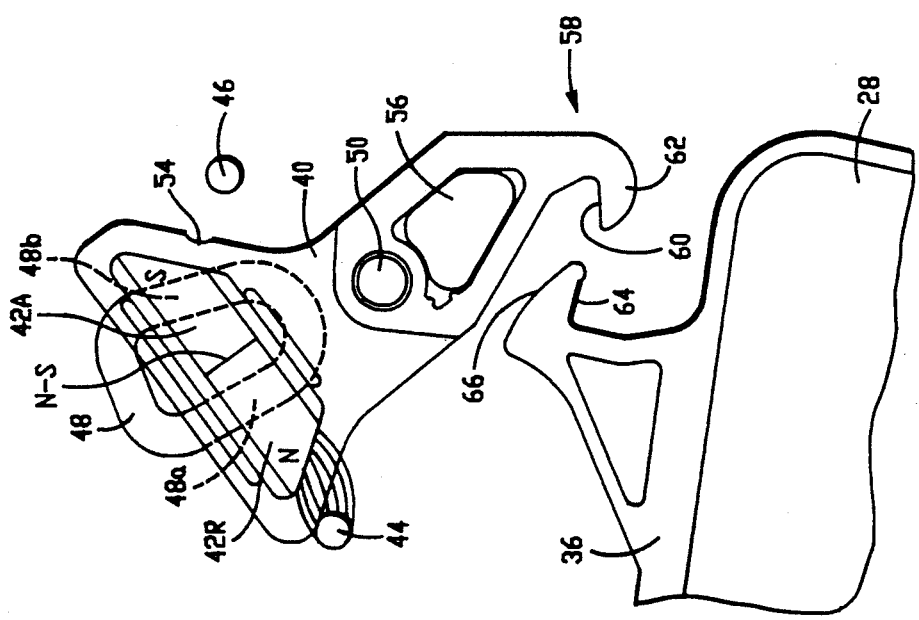

BISTABLE MAGNETIC/ELECTROMAGNETIC LATCH FOR DISK FILE ACTUATOR

FIELD OF THE INVENTION

The present invention relates to latching mechanisms. More particularly, the present invention relates to a bistable latch employing magnetic and electromagnetic elements for latching a disk file actuator so that the data transducer heads are parked and maintained at a predetermined landing zone.

BACKGROUND OF THE INVENTION

In accordance with Winchester fixed disk drive technology, data transducer head sliders "fly" upon an air bearing effect in very close proximity, e.g. 7 microinches, to a disk data storage surface. The air bearing exists only when the storage disk is rotating. When the disk stops rotating, in a "contact-start-stop" disk drive, the head sliders "land" on the disk surface. Storage media is frequently provided with an overcoat or a lubricating coat in order to withstand direct contact between the head slider and the storage surface. Consequently, some disk drive manufacturers permit the slider to land at any location of the data storage disk.

Direct contact between the disk and the heads may abrade or interfere with the storage media. Data recorded at the location of direct contact may be changed, or a permanent defect, known as a "hard error" may develop. Accordingly, many disk drive manufacturers provide a dedicated landing zone for the head sliders. This landing zone is usually selected to be the innermost useable radius of the data storage disk, as magnetic storage cells or domains are fewest at the radially inwardmost area of the disk.

Head sliders are typically formed of highly lapped ferrite ceramic material. The edges of the rails are very sharp. Radial displacement of the head sliders while in contact with the data storage surface has proven very detrimental to the integrity of the storage surface. Such movements may gouge, scratch or scrape away the magnetic data storage coating. Thus, a latch is provided to lock the head positioner assembly (herein "actuator") at the landing zone when power is removed from the disk drive and/or the spindle motor is not spinning (as may occur during a reduced power standby state).

Actuator latches have taken many forms. One approach pioneered by the assignee of the present invention has been an aerodynamically released actuator latch which operates to release the actuator in response to airflow generated by disk rotation which overcomes a bias force; see, e.g. commonly assigned U.S. Pat. Nos. 4,538,193; 4,692,829; and, 4,647,997. One drawback of the approaches described in these patents is that with small disk diameters, such as 3.5" and below, airflow from a single disk is simply insufficient to enable the actuator latch to operate reliably within a manufacturable design for mass production of disk drives.

Bistable electromagnetic latches have been proposed in the prior art. Pertinent examples include U.S. Pat. No. 4,881,139 to Hazebrouck; U.S. Pat. No. 4,654,735 to Izraelev et al.; U.S. Pat. No. 4,965,684 to Stefansky; and, U.S. Pat. No. 4,903,157 to Malek. Other patents considered in preparation of the application leading to this patent include U.S. Pat. Nos. 4,890,176 and 4,947,274 to Casey et al.; U.S. Pat. No. 4,868,695 to Quatro et al.; U.S. Pat. No. 4,851,943 to Perry; U.S. Pat. No. 4,764,831 to Patel; U.S. Pat. No. 4,751,595 to Kishi et al.; U.S. Pat. No. 4,706,142 to Hattori et al.; U.S. Pat. No. 4,686,595 to Bryer; U.S. Pat. No. 4,660,120 to Manzke et al.; U.S. Pat. No. 4,139,874 to Shiraishi; U.S. Pat. No. 4,594,627 to Viskochil et al.; U.S. Pat. No. 4,716,480 to Wiens et al.

Despite the numerous and varied approaches exemplified by the above patents, a hitherto unsolved need has remained for a very effective, low cost latch mechanism for latching a disk drive actuator to maintain the heads in the landing zone when the disk is not spinning.

SUMMARY OF THE INVENTION WITH OBJECTS

A general object of the present invention is to provide a latch for a disk drive actuator which overcomes limitations and drawbacks of prior approaches.

A more specific object of the present invention is to provide a magnetic element and an intermittently energized electromagnetic actuation element to realize a bistable latch for a disk drive actuator.

Another specific object of the present invention is to provide a bistable latch for a disk drive actuator which may be configured to have considerably more holding power in an armed position when latching the actuator than is present in a release position.

A further specific object of the present invention is to provide a bistable latch for a disk drive actuator which may be switched from its release position to an armed position with a switching current developed from back EMF of a disk spindle motor wherein the back EMF is also sufficient to return the actuator to the landing zone.

One more specific object of the present invention is to provide a bistable latch method which enables the holding power in each stable position to be readily adjusted.

Yet another specific object of the present invention is to provide a bistable latch including a single moving part and a few stationary parts so as to be realized at very low additional cost.

Still one more specific object of the present invention is to provide a bistable latch for a disk drive actuator wherein the latch comprises a subassembly which may be installed as a finished unit within the head and disk assembly including the drive actuator.

In accordance with one facet of the present invention, a bistable latch is provided for latching a disk file actuator within a disk drive. The disk drive includes a base, and the actuator is moveably mounted relative to the base. The actuator latch comprises a latch engagement structure defined by the actuator, a latch mounting structure mounted in reference to the base, and a latch body moveably mounted to the latch mounting structure and positionable between a first bistable position and a second bistable position. The latch body includes at least one permanent magnet defining e.g. two opposed north pole-south pole segments. Plural detent pins are fixed relative to the base and are formed of a ferromagnetic material. One of the pins comes within a fringe flux of a first north pole-south pole segment at the first bistable position, and another of the pins comes within a fringe flux of a second north pole-south pole segment at the second bistable position. An electrical coil is disposed in relation to the two segments of the permanent magnet whereby current flowing in the coil in one direction causes the body to move to the first bistable position, and reverse direction current flowing in the coil causes the body to move to the second bistable position. A latching structure is defined by the latch body for engaging the latch engagement structure of the actuator when the latch body is positioned at one of the positions and also when the actuator is positioned in predetermined relation to a data storage disk of the disk drive.

As an aspect of this facet of the invention, the latch mounting structure comprises a pivot pin, and the latch body rotates about the pivot pin along a locus of rotational displacement limited by the plural detent pins.

As another aspect of this facet of the invention, the latch body comprises an elongate structure defining a central journal opening, a permanent magnet opening generally on one side of the central journal opening and the latching structure on another side of the central journal opening opposite to the permanent magnet opening, and wherein said permanent magnet comprises an elongated bar magnet located in the permanent magnet opening of the latch body.

As a further aspect of this facet of the invention, the latch body defines a counterbalance region located on the latching structure side, and a counterbalance is located in the counterbalance region, thereby mass balancing the latch body with reference to an axis of rotation thereof extending through the central journal opening.

As one more aspect of this facet of the invention, the electrical coil includes two opposite segments such that each segment is associated with one of the poles of the permanent magnet. For example, the electrical coil may be formed as a flat coil having two segments: a first segment associated with the north pole of the permanent magnet, and a second segment associated with the south pole of the permanent magnet.

As still one more aspect of this facet of the invention, the plural detent pins are positioned relative to the permanent magnet such that an attraction force between one of the segments and an adjacent one of the detent pins when in a corresponding bistable position is less than an attraction force between the other of the segments and an adjacent other of the detent pins when in the other corresponding bistable position.

As yet another aspect of this facet of the invention, the latch engagement structure defined by the actuator and the latching structure defined by the latch body respectively define snap locking surfaces such that relative movement of the latch engagement structure will slideably engage the latching structure and move the latch body slightly away from one of its bistable positions, until a latching position is reached, whereupon the latch body returns to the particular bistable position, and the engagement structure is thereupon engaged by the latching structure.

As a further facet of the present invention, a bistable magnetic/electromagnetic latch sub-assembly is provided for releasably latching a disk file actuator in order to park data transducer heads at a predetermined location of a data storage disk rotatably mounted to a base within a fixed disk data storage subsystem. The subassembly comprises a mounting flange for mounting to the base in operative proximity to the disk file actuator, a latch body rotatably mounted to the mounting flange, the latch body including a permanent magnet and an actuator engagement latch. Plural detent pins extend from the mounting flange and limit rotational displacement of the latch body. The pins coact with the permanent magnet to hold the latch body at a release detent position and also to hold the latch body at an armed detent position wherein the actuator engagement latch is positioned to engage and latch the actuator. An electrical coil is fixed to the mounting flange in operative proximity to the permanent magnet and generates latch position switching fluxes for switching the latch body between the armed detent position and the release detent position in accordance with the direction of an intermittent actuation current flow.

As another facet of the present invention, a method is provided for controlling a bistable latch for a disk file actuator within a disk drive following removal of power, the disk drive including a DC brushless spindle motor, the method comprising the steps of:

rectifying an output from the DC brushless spindle motor to obtain a direct current, splitting the direct current into a first path and a second path, applying the first path to return the disk file actuator to a head landing position, and, applying the second path to actuate the bistable latch to move it to an armed position for latching the disk file actuator at the head landing position.

As one aspect of this facet of the invention, the step of applying the second path to actuate the bistable latch comprises the step of applying the direct current to a coil which operates in conjunction with a permanent magnet to move the bistable latch to its armed position.

These and other objects, advantages, aspects and features will be more fully understood and appreciated upon consideration of the following detailed description of a preferred embodiment, presented in conjunction with the accompanying drawings.

BRIEF DESCRIPTION OF THE DRAWINGS

In the Drawings:

FIGS. 4A, 4B and 4C are diagrammatic views of the FIG. 2 latch wherein the FIG. 4A plan view illustrates the release position, the FIG. 4B plan view illustrates the armed and latched position, and the FIG. 4C view in elevation illustrates the magnetic segments and flux relationships between the permanent magnet and the coil of the FIG. 2 latch.

DETAILED DESCRIPTION OF A PREFERRED EMBODIMENT

In order to appreciate and understand the present invention, a presently preferred embodiment thereof is illustrated in combination with a head and disk assembly ("HDA") 10 of a fixed disk drive data storage subsystem. The HDA 10 includes a base 12 to which all other elements of the HDA 10 are mounted and/or referenced structurally. At least one data storage disk 14 is mounted within an enclosed interior space of the HDA 10, e.g. as defined by continuous sidewalls of the base 12 and a removable cover (not shown in FIG. 1). The storage disk 14 is mounted to the base 12 via a spindle 16 containing e.g. an in-hub DC brushless spindle motor. The spindle motor rotates the disk 14 at a predetermined angular velocity, such as 3600 RPM.

Figure 1:
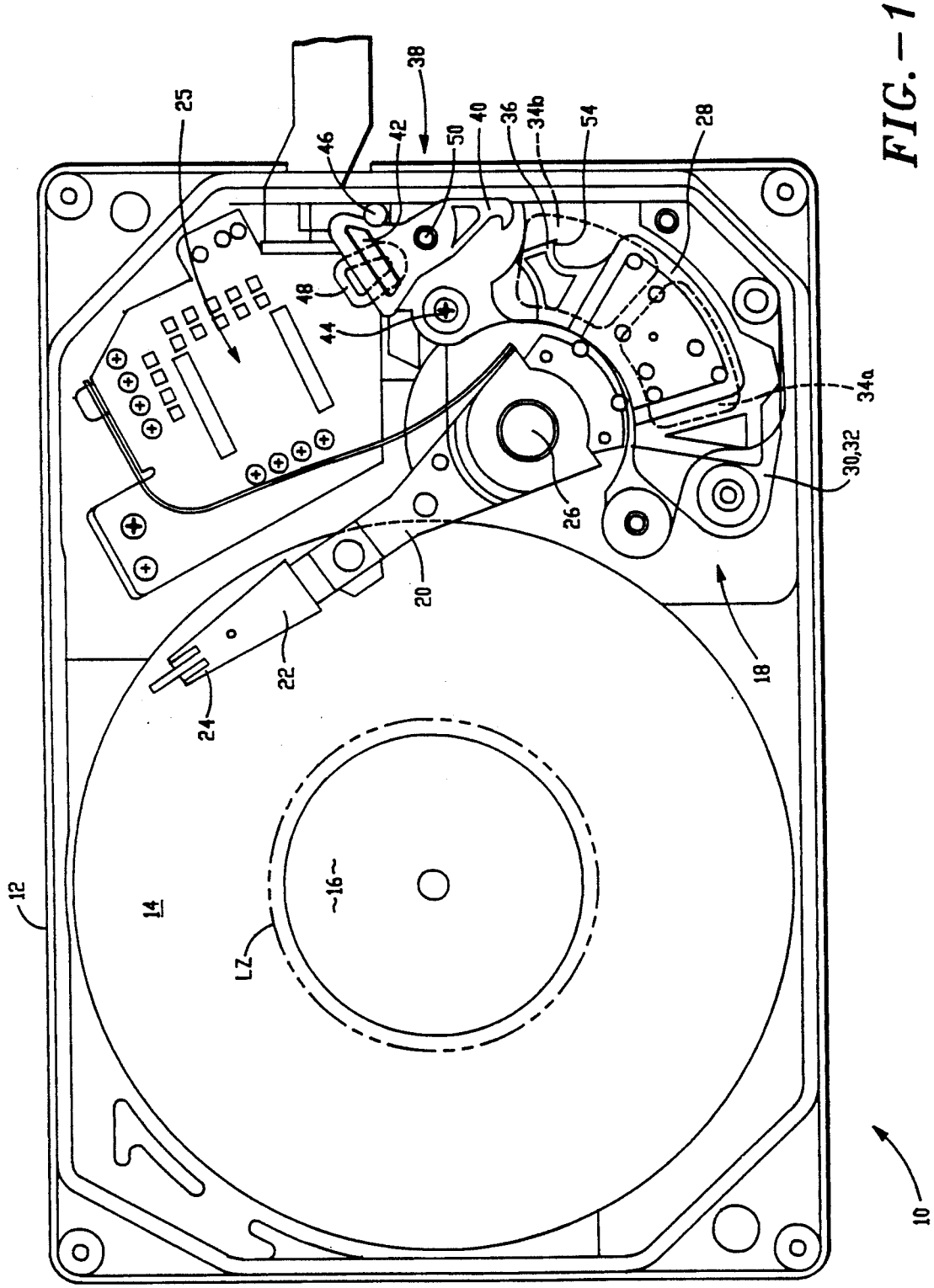
FIG. 1 is an enlarged plan view of a sub-micro Winchester fixed disk drive including a bistable actuator latch in accordance with principles of the present invention, showing the latch in its release position.

While the storage disk 14 may have any suitable diameter, it most preferably comprises a sub-micro Winchester form factor, such as approximately 2.5 inches, or smaller. Thus, evidently FIG. 1 is considerably enlarged over an actual HDA embodying the principles thereof.

An exemplary mass balanced rotary voice coil actuator assembly 18 includes a head arm 20 to which is mounted at least one load beam 22. The load beam 22 supports a data storage transducer head slider 24 at an outer peripheral region thereof. The slider 24 includes a data transducer head, most preferably formed as a thin film head, for example. The load beam 22 is designed to act as a spring as well as a support, and it applies a predetermined loading force on the head slider 24 to urge it toward the data storage surface of the disk 14. This force is overcome by the air bearing generated by rotation of the disk 14 during operations of the data storage subsystem of which the HDA 10 is an integral part.

The rotary actuator assembly 18 is mounted to a shaft 26 fixed to the base 12 by suitable bearings (not shown), so that the actuator 18 is generally free to rotate along a locus of limited rotational displacement, thereby moving the head 24 from an outer region of the disk 14 to an inner region thereof, including a landing zone LZ. Electronics circuitry, such as a read preamplifier/write driver and switch circuit, and other related circuit elements are mounted to e.g. a flexible plastic film circuit substrate 25. An extension of the substrate 25 exits the interior space of the HDA between an upper lip of the base sidewall and a gasket sealing the cover to the upper lip of the continuous sidewall.

Also included within the rotary actuator assembly 18 are a flat, generally wedge shaped actuator voice coil 28. The actuator voice coil 28, comprising a coil of insulated small gauge copper wire, is preferably formed integrally with the head arm 20 by conventional plastic encapsulation/molding techniques. The flat voice coil 28 is positioned within a magnetic gap formed between an upper flux return plate 30 formed of suitable ferromagnetic steel, and a lower flux return plate 32 of the same material. Two or four high flux intensity permanent magnets and are secured to the flux return plates 30 and 32. In the present example, two magnets 34a and 34b are shown secured to the lower flux return plate 32 and have pole faces of opposite polarity directly facing opposite legs of the coil 28. Current passing through the coil 28 in one direction causes rotation of the actuator assembly 18 in one radial direction relative to the disk 14, while reverse current causes reverse direction movement. The magnets 34a and 34b may comprise ceramics of a magnetized rare earth element such as neodymium, for example.

In accordance with principles of the present invention, a latch arm extension 36 is preferably formed as an integral part of the actuator coil 28 and in the present example 10 extends from one side thereof toward a bistable latch sub-assembly 38. The latch sub-assembly 38 essentially comprises a bracket 68, a rotatable latch body 40 pivotally mounted to the bracket 68, a permanent magnet 42 embedded in the latch body 40, a release position detent pin 44, an armed position detent pin 46, a flat, wedge latch coil 48 secured to the bracket 68, and a journal pin 50. The pins 44, 46 and 50 are staked into recesses of the bracket 68 during a manufacturing process for the sub-assembly 38. The latch body 40 is positioned over the journal pin 50 and held in place by a locking clip 52 (see FIG. 3). Once positioned on the journal pin 50, the body 40 is freely rotatable between limits established by the detent pins 44 and 46.

Figure 2:
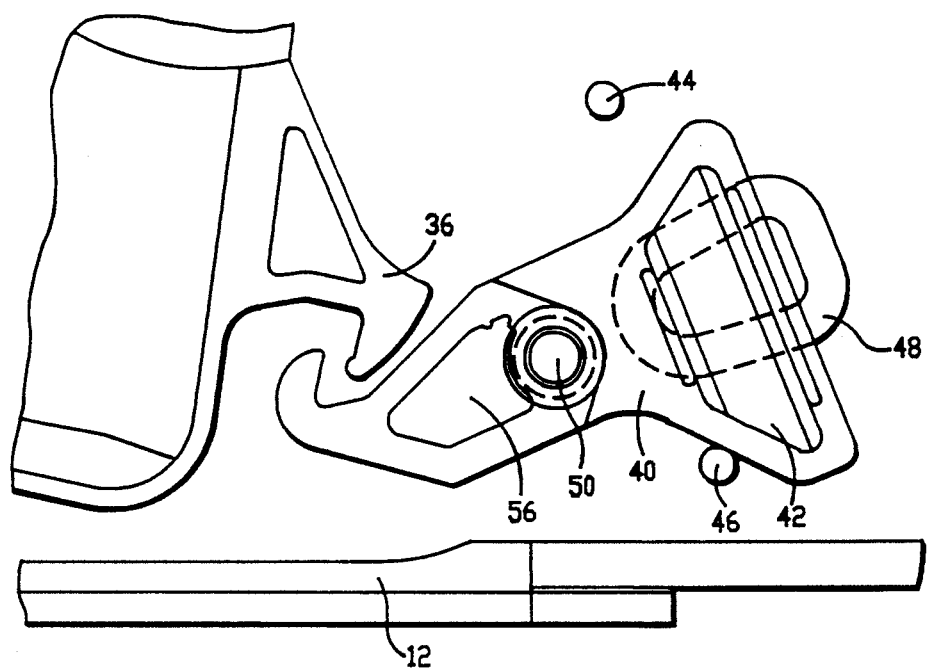
FIG. 2 is an enlarged plan view of the latch shown in FIG. 1.

Turning now to FIG. 2, the permanent magnet 42 is also preferably formed of a rare earth metal element, such as neodymium, for example. It is magnetized to have e.g. two segments divided by a central transverse region denoted N-S in FIGS. 4A, 4B and 4C. Each segment includes a north pole (N) at one face thereof, and a south pole (S) at an opposite face thereof. Fringe fields at the respective ends of the elongate magnet 42 adjacently face the release detent pin 44 in a release position, and the arm detent pin 46 in an armed position of the latch body 40. The detent pins 44 and 46 are formed of a suitable ferromagnetic material, such as 400 series stainless steel, and are respectively attracted by the polar fringe fields associated with the north and south pole segments of the magnet 42.

FIG. 4A illustrates the attraction of one north pole-south pole segment of the magnet 42 to the release detent pin 44, while FIG. 4B illustrates attraction of the other north pole-south pole segment of the magnet 42 to the arm detent pin 46. The fringe fields of the segments of the magnet 42 are perhaps best illustrated in FIG. 4C. Also depicted schematically by FIGS. 4A and 4B are the relatively different levels of attraction between the magnet 42 and the pins 44 and 46. The attraction (e.g. 0.5 grams) between the release segment (42R) of the magnet 42 and the release pin 44 in the release position shown in FIG. 4A is about one half of the attraction (e.g. 1 gram) between the arm segment (42A) of the magnet 42 and the arm pin 46 shown in FIG. 4B. This differential may be achieved by a number of techniques and a combination of the techniques.

One of the techniques is to position the release pin 44 to one side of the end of the release segment 42R of the magnet 42 (FIG. 4A) so that it intercepts less of the polar fringe flux, and to position the arm pin 46 directly centered within the polar fringe flux path of the arm segment 42A of the magnet. Another technique is to vary the thickness of the surrounding plastic structure of the latch body 40 such that in the release position shown in FIG. 4A, the release pin 44 is farther away from the release segment 42R of the magnet 42 while the arm pin 46 is closer to the arm segment 42A of the magnet 42. Similarly, a notch 54 may be formed in one or both of the sides of the body 40 in order to enhance the attraction force level of the magnet 42 to one or the other of the detent pins 44 and 46. A third technique is to increase the size and flatten the pins 46 and 48 to present a greater surface area facing each fringe flux region at each end of the magnet 42. Yet another technique is to shape the detent pin into e.g. a "C" shape facing the magnet 42, or enlarge the flange at the base of the detent pin, in order to provide a more efficient flux return path between the pin and the magnet 42.

A counterweight 56 made of a suitable high density material, such as brass, is sized and positioned in an opening of the body 40 opposite to the bar magnet 42. The counterweight is sized and positioned to counterbalance and thereby cancel any unbalancing forces within the body as measured at the pivot pin 50. Thus, the latch body 40 is rendered immune to shock forces applied to the HDA (other than e.g. torquing or rotational forces) or orientation of the HDA 10.

The latch body 40 is preferably molded from a suitable plastic material manifesting suitable lubricity properties, so that the body 40 freely rotates about the journal pin 50. The bar magnet 42 is mounted within a suitable recess by any satisfactory mounting arrangement. Ultrasound or heat staking of portions of the body 40 may be employed to secure the bar magnet in its intended position and orientation. Similar techniques are used to mount the counterweight 56. Since the plastic material comprising the body 40 is of a high lubricity, the use of adhesives and the like may not prove satisfactory to secure the magnet and counterweight. Of course, the magnet and counterweight may be integrally molded with the body 40, or they may be formed of materials which are more suitable to bonding to, or integration into, the body 40.

A latch end 58 includes a flat latching surface 60, and a curved outer surface 62. Similarly, the latch arm extension 36 molded with the coil 28 includes a flat latching surface 64 and a slightly curved outer surface 66. As shown in FIG. 4B, the flat surfaces 60 and 64 face each other and securely engage one another when the body 40 is in the armed and latched position.

Under some conditions, the latch body 40 may reach the armed position (FIG. 4B) before the actuator 18 has reached the landing zone LZ and latch arm extension 36 has reached the latching position. This situation is shown in FIG. 1 and the circumstances causing this situation will be discussed shortly. By providing the curved surfaces 62 and 66, when the arm extension 36 encounters the body 40 in the armed position (FIG. 4B), the surface 66 contacts the curved surface 62 and causes the body 40 to rotate slightly, until the body 40 snap locks onto the arm 36. Once snap-lock engagement is obtained, the attractive force of the arm segment 42A of the magnet 42 toward the armed position detent pin 46 maintains snap-lock engagement, until the body 40 is caused to rotate to the release position (FIG. 4A) by passing an appropriate direct current through the coil 48.

Figure 3:
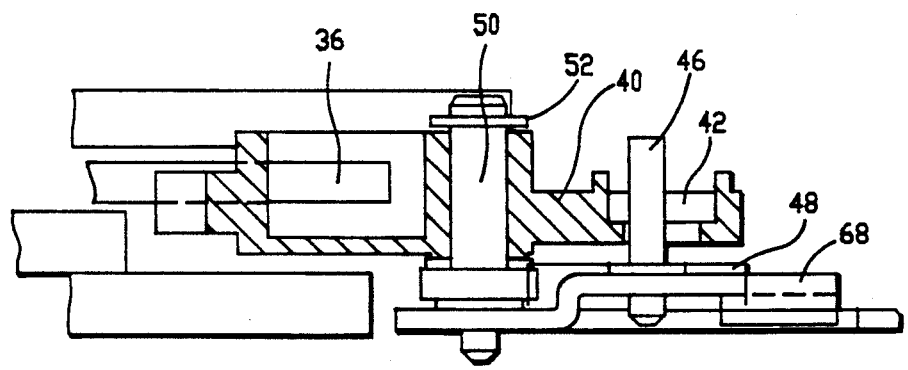
FIG. 3 is a sectional view in elevation of the FIG. 2 latch.

The coil 48 is sized and so designed as to include two segments 48a and 48b which are on opposite sides of the N-S transition of the magnet. In practice, the coil 48 has been wound on a trapezoidal forming mandrel with 90 turns of 39 gauge insulated copper wire. As shown in FIG. 3, the coil 48 may be secured with a suitable adhesive to the mounting bracket 68 preferably formed of non-ferromagnetic metal, such as an aluminum alloy. When the molded body 40 is mounted on the pivot pin 50 and secured by a suitable clip, the latch subassembly 38 is completed, and it may be installed in the HDA 10 after the lower flux plate 30 is installed and before the coil 28 of the voice coil actuator 18 is in place, for example.

There is no flux return path associated with the coil 48 other than the bar magnet 42. While a ferromagnetic flux return plate under the coil 48 has been tested, the effect has been to amplify the electromagnetic flux within the coil 48 in a manner which tends to pull the bar magnet 42 toward the coil, rather than desirably to cause it to rotate between the armed and the released detent positions.

Since the attractive force between the south pole (S) of the magnet 42 and the armed position detent pin 46 is significant, a corresponding amount of current through the coil 48 will be needed to rotate the body 42 to the release position and latch to the release detent pin 44. This current is available during a power-on reset sequence after the spindle motor has rotated the disk 14 to a sufficient velocity to permit the head 24 to fly upon the air bearing effect and avoid direct contact with the disk surface outside of the landing zone. Once the necessary current is applied, for a relatively short duration amounting to a fraction of a second, and the body 40 has rotated to the release detent position against the pin 44, current is removed from the coil 48 and remains removed until it is necessary to return the body 40 to the armed position against the detent pin 46.

Figure 5:
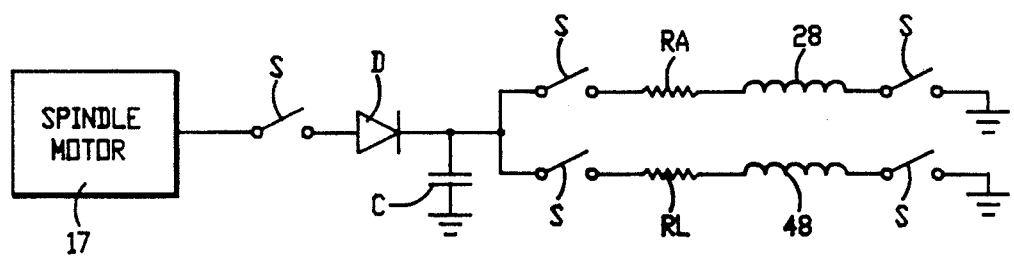
FIG. 5 is a simplified electrical schematic circuit diagram illustrating a method for simultaneously controlling a bistable actuator latch and a disk file actuator during a powering down sequence, in accordance with principles of the present invention.

As shown in FIG. 5, when power is removed from the HDA, a series of electronic switches S are closed, and back EMF generated within the spindle motor 17 is conducted through a diode rectifier D and filter capacitor C to the actuator coil 28 and to the latch coil 48. Resistors RA and RL establish a division of current such that enough current is supplied to the actuator coil 28 to cause it to return the actuator 18 to the head landing zone LZ and enough current is supplied to the latch coil 48 to cause it to rotate to the armed position. In some circumstances, the latch coil may return to the armed position against the pin 46 before the actuator 18 reaches the landing zone LZ, particularly if a relatively long seek is required. Thus, the actuator must be provided with sufficient current to attain sufficient velocity to bring about the snap-locking action required to engage the latch face 60 against the extension arm face 64 as shown in FIG. 4B.

To those skilled in the art, many changes and modifications will be readily apparent from consideration of the foregoing description of a preferred embodiment without departure from the spirit of the present invention, the scope thereof being more particularly pointed out by the following claims. The descriptions herein and the disclosures hereof are by way of illustration only and should not be construed as limiting the scope of the present invention.

What is claimed is:

1. A bistable latch for a disk file actuator within a disk drive including a base and wherein the actuator is moveably mounted relative to the base, the latch comprising:

latch mounting means mounted in reference to the base, latch body means moveably mounted to the latch mounting means and positionable between a first bistable position and a second bistable position, the latch body means including permanent magnet means, plural detent pin means fixed relative to the base and formed of a ferromagnetic material, one of the pin means coming within a holding flux of the permanent magnet means at the first bistable position, and another of the pin means coming within a holding flux of the permanent magnet means at the second bistable position, electrical coil means disposed in relation to the permanent magnet means for generating switching fluxes from current flowing in the coil means such that current in one direction causes the body means to move to the first bistable position, and reverse direction current flowing in the coil means causes the body means to move to the second bistable position, and latching means defined by the latch body means for engaging an engagement means of the actuator when the latch body means is positioned at one of the first and second bistable positions and when the actuator is positioned in predetermined relation to a data storage disk of the disk drive.

2. The bistable latch set forth in claim 1 wherein said latch mounting means comprises pivot pin means, and wherein said latch body means rotates about said pivot pin means along a locus of rotational displacement limited by said plural detent pin means.

3. The bistable latch set forth in claim 2 wherein said latch body means comprises an elongate structure defining a central journal opening, a permanent magnet opening generally on one side of the central journal opening and the latching means defined generally on another side of the central journal opening opposite to the permanent magnet opening, and wherein said permanent magnet means comprises an elongated magnet means located in said permanent magnet opening.

4. The bistable latch set forth in claim 3 wherein said latch body means defines a counterbalance region located on the said another side, and further comprising counterbalance means located in the counterbalance region, thereby mass balancing the latch body means with reference to an axis of rotation thereof extending through the central journal opening.

5. The bistable latch set forth in claim 3 wherein the electrical coil means includes a flat coil having two segments: a first leg associated with a first polar segment of the permanent magnet means, and a second leg associated with a second polar segment of the permanent magnet means of opposite polarity to the first segment thereof.

6. The bistable latch set forth in claim 1 wherein the electrical coil means includes two oppositely facing segments wherein each segment is associated with a magnetic segment of the permanent magnet means.

7. The bistable latch set forth in claim 1 wherein the plural detent pin means are positioned relative to the permanent magnet means such that an attraction force between the magnet means and an adjacent one of said detent pin means when in a corresponding bistable position is less than an attraction force between the magnet means and an adjacent other of said detent pin means when in the other corresponding bistable position.

8. The bistable latch means set forth in claim 1 wherein the latch engagement means defined by the actuator and the latching means defined by the latch body means respectively define snap locking surfaces such that relative movement of the latch engagement means will slideably engage the latching means and move the latch body means slightly away from one of the bistable positions, until a latching position is reached, whereupon the latch body means returns to the said one of the bistable positions and engagement means is thereupon engaged by the latching means.

9. A bistable magnetic/electromagnetic latch subassembly for releasably latching a disk file actuator in order to park data transducer heads at a predetermined location of a data storage disk rotatably mounted to a base within a fixed disk data storage subsystem, the latch sub-assembly comprising:

mounting flange means for mounting to the base in operative proximity to the disk file actuator, latch body means rotatably mounted to the mounting flange means, the latch body means including permanent magnet means and actuator engagement means, plural detent pin means fixed to the mounting flange means and limiting rotational displacement of the latch body means and for coacting with the permanent magnet means to hold the latch body means at a release detent position and also to hold the latch body means at an armed detent position wherein the actuator engagement means is positioned to engage and latch the actuator, and electrical coil means fixed to the mounting flange in operative proximity to the permanent magnet means for generating switching fluxes for switching the latch body means between the armed detent position and the release detent position in accordance with the direction of an intermittent actuation current flow through the electrical coil means.

10. The bistable magnetic/electromagnetic latch subassembly set forth in claim 9 wherein said latch body means comprises an elongate structure defining a central journal opening, a permanent magnet opening generally on one side of the central journal opening and the actuator latch engagement means generally on another side of the central journal opening opposite to the permanent magnet opening, and wherein said permanent magnet means comprises an elongated magnet means located in said permanent magnet opening.

11. The bistable magnetic/electromagnetic latch subassembly set forth in claim 10 wherein said latch body means defines a counterbalance region located on the said another side, and further comprising counterbalance means located in the counterbalance region, thereby mass balancing the latch body means with reference to an axis of rotation thereof extending through the central journal opening.

12. The bistable magnetic/electromagnetic latch subassembly set forth in claim 9 wherein the electrical coil means includes two oppositely facing portions wherein each portion is associated with a polar magnetic segment of the permanent magnet means.

13. The bistable magnetic/electromagnetic latch subassembly set forth in claim 9 wherein the plural detent pin means are positioned relative to the permanent magnet means such that an attraction force between the magnet means and an adjacent one of said detent pin means when in a corresponding bistable position is less than an attraction force between the magnet means and an adjacent other of said detent pin means when in the other corresponding bistable position.

14. The bistable magnetic/electromagnetic latch subassembly set forth in claim 9 wherein the actuator latch engagement means and complementary means defined by the actuator provide snap locking surfaces such that relative movement of the actuator complementary means and the actuator latch engagement means will result in slideable engagement between the latching means so as to move the latch body means slightly away from the armed bistable position, until a latching position is reached, whereupon the latch body means returns to the said armed position thereby latching the actuator means.

15. A method for controlling a bistable latch for a disk file actuator within a disk drive following removal of power, the disk drive including a DC brushless spindle motor, comprising the steps of:

rectifying an output from the DC brushless spindle motor to obtain a direct current, splitting the direct current into a first path and a second path, applying the first path to return the disk file actuator to a head landing position, and, applying the second path to actuate the bistable latch to move it to an armed position for latching the disk file actuator at the head landing position.

16. The method set forth in claim 15 wherein the step of applying the second path to actuate the bistable latch comprises applying the direct current to a coil which operates in conjunction with a permanent magnet.

* * * * *